(12) United States Patent
McCoy

(10) Patent No.: US 9,522,583 B2
(45) Date of Patent: *Dec. 20, 2016

(54) REMOVABLE SAFETY CHAIN TIE DOWN APPARATUS

(71) Applicant: Cequent Performance Products, Inc., Plymouth, MI (US)

(72) Inventor: Richard W. McCoy, Granger, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,243

(22) Filed: Jan. 28, 2013

(65) Prior Publication Data

US 2013/0193671 A1    Aug. 1, 2013

Related U.S. Application Data

(63) Continuation-in-part of application No. 13/541,976, filed on Jul. 5, 2012, now Pat. No. 8,360,458, which is a continuation of application No. 12/578,978, filed on Oct. 14, 2009, now Pat. No. 8,215,658.

(60) Provisional application No. 61/195,968, filed on Oct. 14, 2008.

(51) Int. Cl.
*B60D 1/14* (2006.01)
*B60D 1/28* (2006.01)
*B60D 1/58* (2006.01)
*B60D 1/06* (2006.01)
*B60D 1/48* (2006.01)
*B60P 7/08* (2006.01)

(52) U.S. Cl.
CPC . *B60D 1/28* (2013.01); *B60D 1/06* (2013.01); *B60D 1/488* (2013.01); *B60D 1/58* (2013.01); *B60P 7/0807* (2013.01); *Y10S 280/901* (2013.01)

(58) Field of Classification Search
CPC ............. B60D 1/28; B60D 1/06; B60D 1/488; B60D 1/58; B60P 7/0807
USPC ........................... 280/491.5, 433, 495, 438.1
See application file for complete search history.

(56) References Cited

U.S. PATENT DOCUMENTS

| 2,962,245 A | 11/1960 | Molzan et al. |
| 3,106,377 A | 10/1963 | Cotton |
| 3,252,681 A | 5/1966 | Watts |

(Continued)

OTHER PUBLICATIONS

U.S. Appl. No. 13/833,789, filed Mar. 15, 2013, Inventor: Lynn H. Mida—Gooseneck Hitch Ball.

*Primary Examiner* — Kevin Hurley
*Assistant Examiner* — Marlon A Arce
(74) *Attorney, Agent, or Firm* — McDonald Hopkins LLC

(57) ABSTRACT

A tie down apparatus that may be utilized for securing an item, such as a safety chain, wherein the tie down apparatus may be used with a hitch mounting system. In one embodiment, the tie down apparatus may include a receiving member, a tie down member, and a clocking member. The receiving member may include an opening located there through. The tie down member may include at least one aperture, wherein the tie down member may be capable of being located and rotated within the receiving member. The tie down member may be rotated either clockwise or counterclockwise. The locking member may include at least one leg capable of being housed within the aperture. The locking member may engage the receiving member once the tie down member is rotated, thereby trapping the item within the tie down apparatus.

28 Claims, 11 Drawing Sheets

(56) References Cited

U.S. PATENT DOCUMENTS

| | | | |
|---|---|---|---|
| 3,272,061 A * | 9/1966 | Seckerson | 411/15 |
| 3,367,000 A | 2/1968 | Schluter | |
| 3,595,125 A | 7/1971 | Jacobs | |
| 3,739,432 A | 6/1973 | Sander et al. | |
| 3,816,882 A * | 6/1974 | Maeda et al. | 411/549 |
| 4,091,744 A | 5/1978 | Crissy et al. | |
| 4,457,650 A | 7/1984 | Tseng | |
| 4,630,982 A | 12/1986 | Fenner | |
| 5,265,992 A | 11/1993 | Jensen | |
| 5,571,270 A | 11/1996 | Larkin | |
| 5,738,363 A | 4/1998 | Larkin | |
| 5,738,471 A | 4/1998 | Zentner et al. | |
| 5,893,575 A | 4/1999 | Larkin | |
| 6,065,766 A | 5/2000 | Pulliam | |
| 6,193,261 B1 | 2/2001 | Hahka | |
| 6,422,795 B2 * | 7/2002 | Holt et al. | 410/115 |
| 6,467,791 B1 | 10/2002 | Fandrich et al. | |
| 6,502,846 B2 | 1/2003 | Fandrich et al. | |
| 6,520,528 B2 | 2/2003 | Fandrich et al. | |
| 6,695,338 B1 | 2/2004 | Roberts | |
| 6,783,144 B2 | 8/2004 | McCoy et al. | |
| 6,969,090 B1 | 11/2005 | Works | |
| 6,983,950 B2 | 1/2006 | McCoy et al. | |
| 7,121,573 B2 | 10/2006 | Lindenman et al. | |
| 7,472,919 B2 | 1/2009 | Pratt et al. | |
| 7,828,317 B2 | 11/2010 | Withers et al. | |
| 8,011,685 B2 | 9/2011 | Belinky et al. | |
| 8,215,658 B2 | 7/2012 | Stanifer et al. | |
| 2003/0034633 A1 | 2/2003 | Belinky | |
| 2006/0163840 A1 | 7/2006 | Schwalbe | |
| 2008/0315557 A1 | 12/2008 | Stanifer et al. | |
| 2013/0127137 A1 | 5/2013 | McCoy et al. | |

\* cited by examiner

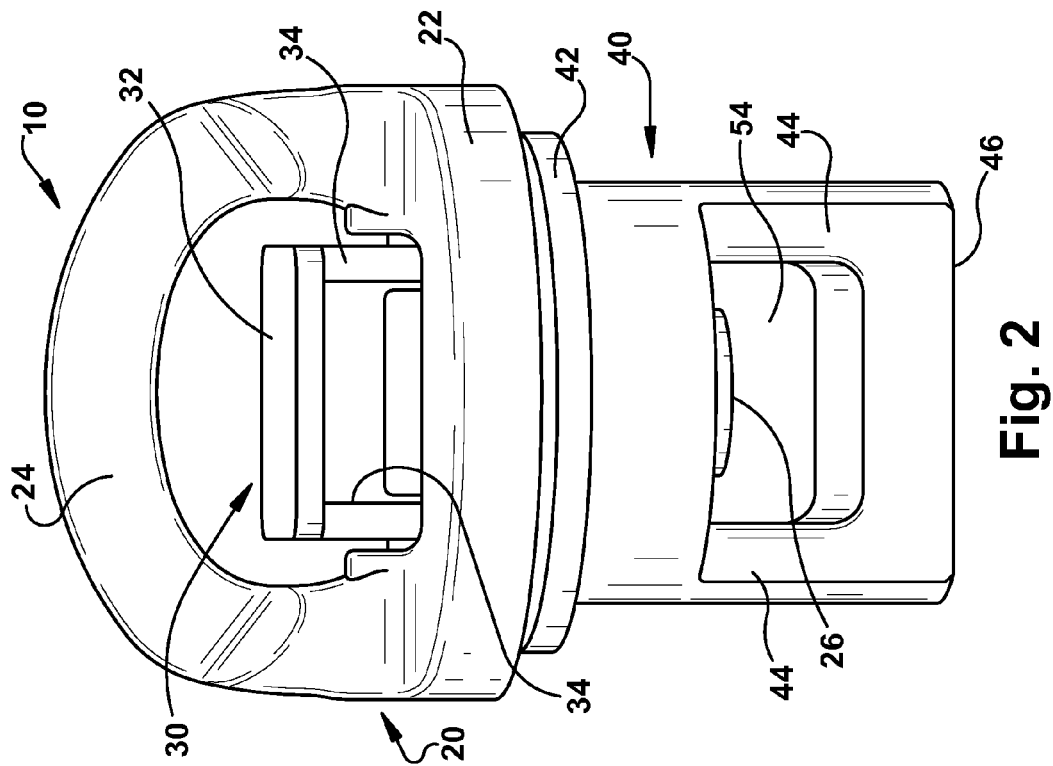
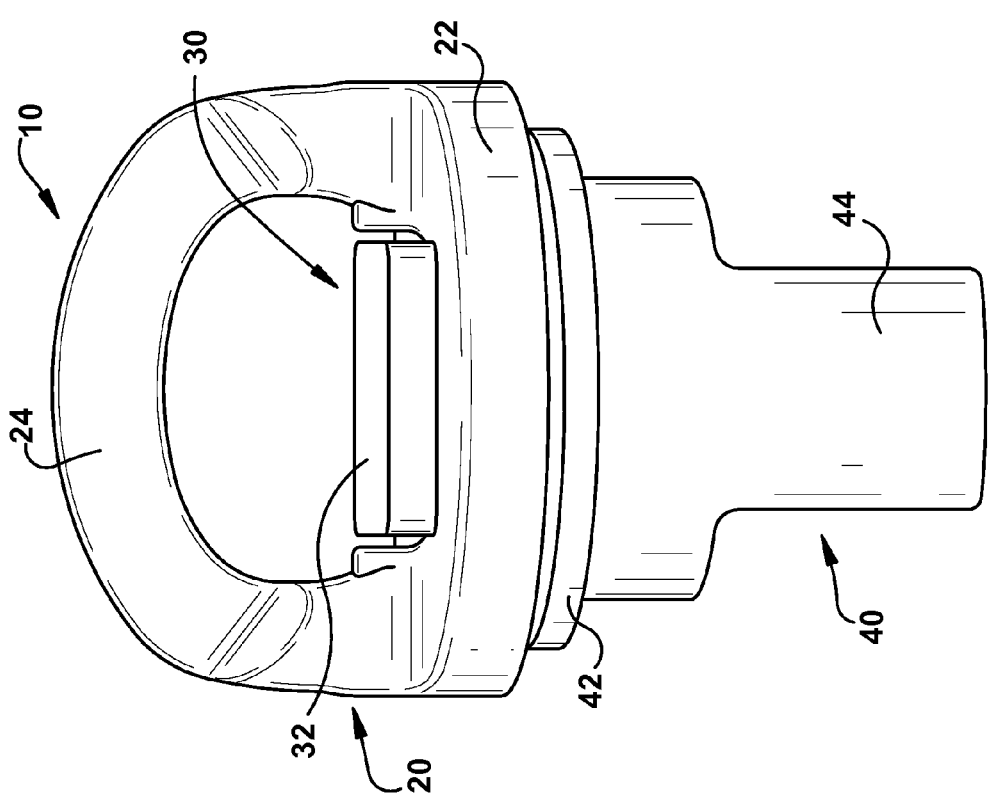

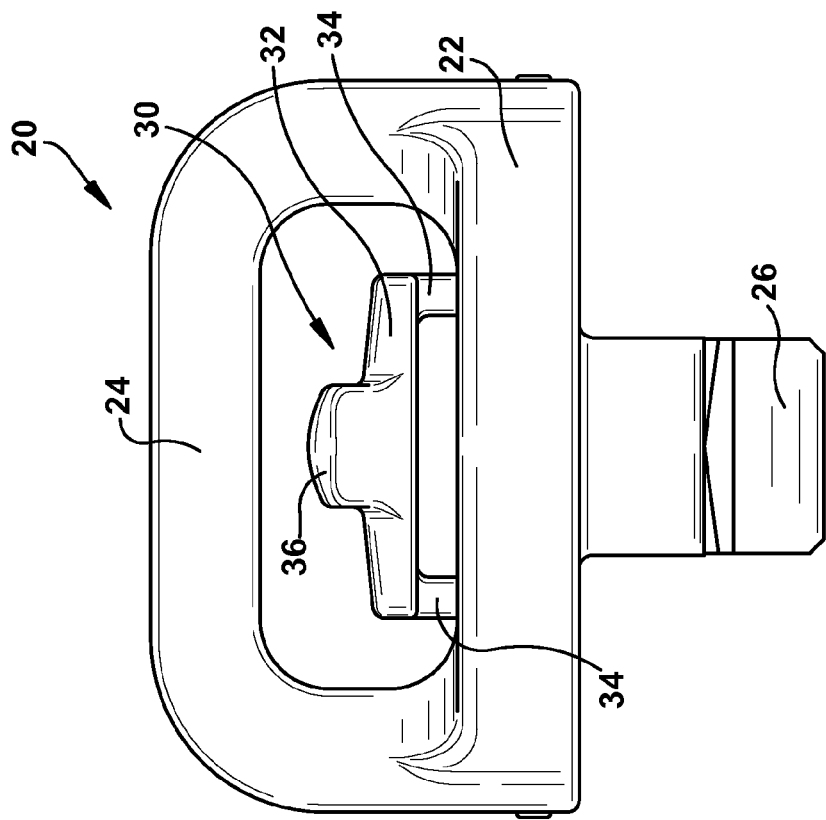
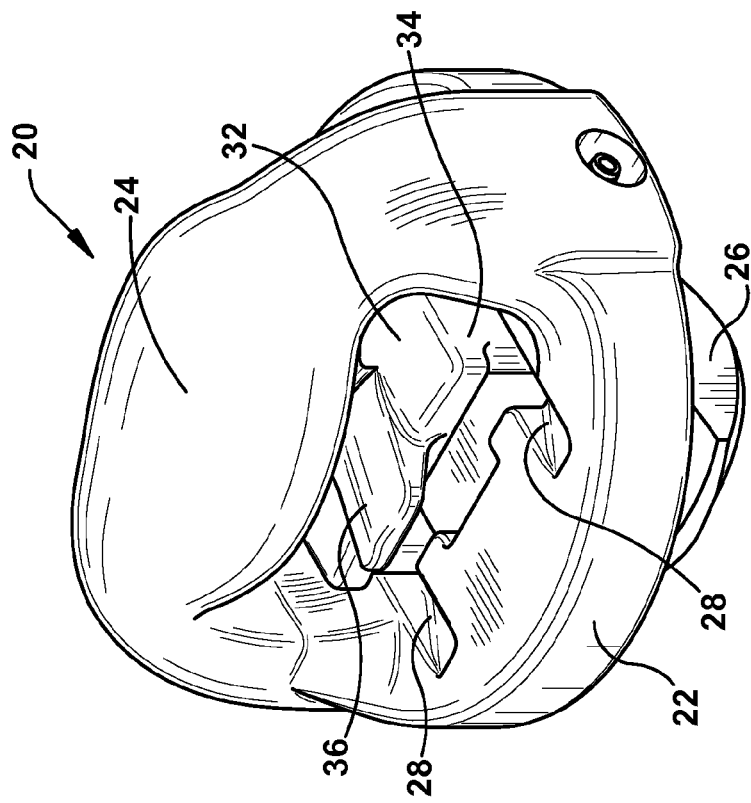

REMOVABLE SAFETY CHAIN TIE DOWN APPARATUS

CROSS-REFERENCE TO RELATED APPLICATION

This application is a continuation-in-part of prior U.S. patent application Ser. No. 13/541,976, entitled "Removable Safety Chain Tie Down Apparatus," filed on Jul. 5, 2012, which is a continuation of prior U.S. patent application Ser. No. 12/578,978, now U.S. Pat. No. 8,215,658 entitled "Removable Safety Chain Tie Down Apparatus" filed on Oct. 14, 2009, which claims benefit from U.S. Provisional Patent Application No. 61/195,968, entitled "Removable Safety Chain Tie Down Apparatus," filed on Oct. 14, 2008, all of which are hereby incorporated in their entirety by reference.

FIELD OF INVENTION

The present invention generally relates to hitches used for coupling a trailer to a towing vehicle and more particularly to a removable tie down apparatus for securing the safety chains of a trailer being towed.

BACKGROUND

It is well known in the art to utilize a trailer hitch to connect a trailer to a towing vehicle. There are many different types of trailer hitches known in the art that may be attached to the towing vehicle in a variety of ways, depending on the type of hitch. Some of the most common types of hitches include gooseneck, fifth wheel, front mount, and the like. Typically, trailers are connected to a towing vehicle by way of a ball hitch secured to the vehicle and a ball socket coupling mechanism on the trailer that mounts over the ball and thereby allows for the trailer to pivot behind the towing vehicle.

The ball hitch of some hitches, such as gooseneck and fifth wheel, for example, is commonly mounted in the bed of a pickup truck near the longitudinal centerline of the bed, so that the weight of the trailer is evenly distributed between the tires on the two sides of the pickup truck. This type of hitch is often secured to the truck structure in an opening cut in the bed of the truck, so that a substantial portion of the hitch attachment is located below the bed of the truck. In addition, the ball typically may be removed or lowered to a stowed position below the bed to ensure that the use of the bed is not substantially hindered by the presence of the ball.

In addition, there are five classes of hitches for towing trailers. Each class is designed for a specific trailer weight range. When selecting the appropriate hitch make sure the weight rating of the hitch is greater than the loaded weight of the trailer that will be towed. The tow vehicle capacity for weight carrying and hitch attachment will vary and will sometimes dictate the class of hitch that can be used. The class of hitch helps determine how much weight can safely be fastened to the towing vehicle, whereas the style differences exist to accommodate different towing needs and different towing vehicles. Gooseneck trailer hitches are considered to be heavy duty and are made to fasten trailers weighing 10,000 pounds or more. Gooseneck hitches are made to accommodate things like horse trailers and other oddly shaped trailers whose weight is not evenly distributed.

A gooseneck hitch is designed for use in a pickup truck similar to a fifth wheel. The difference is that the gooseneck uses a ball and coupler verses a kingpin and pin receiver. Gooseneck hitches are offered in a few types of configurations and can be mounted above or below the trucks pickup bed. Either design (above or below) allows for minimal obstruction when the ball is not in the towing position.

As is known in the art, a gooseneck trailer hitch is placed in the truck bed above the rear axle and the trailer is then secured to it. A gooseneck hitch is much stronger than a regular ball hitch and can haul much more weight. The primary goal of the gooseneck hitch is to provide as much of the gooseneck hitch assembly as possible beneath the bed of the pick-up truck. The hitch balls themselves are typically removable or retractable so that when the hitch is not in use, the hitch ball may be removed or refracted so as not to obstruct the bed of the pick-up truck in any significant manner.

With primary emphasis placed on storing/removing these hitch assemblies so as to avoid obstructions within the truck bed, hitch assemblies have generally overlooked the importance of placement of maintenance fittings and typically only include such fittings in inconvenient locations, such as under the bed of the truck.

Consumers often utilize additional trailer hitch accessories with their trailers. These accessories are products that mount or secure to the trailer, such as safety chains, couplers, coupler locks, jacks, trailer lights, bearing protectors, winches and hitch balls, for example.

It is well known in the art, to utilize safety chains with a trailer. Safety chains are an added safety measure that is used to provide a secondary means of connection between the rear of the towing vehicle and the front of the trailer or towed vehicle in case of separation. If the safety chain is to be of value, assurance must be had that the safety chain will stay connected to the link if the hitch fails. The consumer should also make sure that the safety chains are never dragging on the road when hooked up. Safety chains come in a variety of different sizes and strengths. It is important to always use a safety chain that is equal to or stronger than the towing system that is being used.

Safety chains may be secured between the trailer and an anchor within the truck, preferably associated with the hitch to prevent the trailer from breaking away from the pickup truck in the event that the hitch uncouples from the hitch ball. To insure that the safety chain anchor does not substantially obstruct the bed of the truck when the hitch is not being used, the anchor must be adapted so that it may be removed from the hitch or so that it may be lowered to a stowed position in the hitch. Therefore, a need exists in the art to provide an improved safety chain tie down apparatus that is easily removable and operable as well as work with a variety of different hitches.

SUMMARY OF THE PRESENT INVENTION

The present invention provides an apparatus for a removable safety chain tie down. The tie down apparatus may be utilized for securing an item, such as a safety chain, wherein the tie down apparatus may be used with a hitch mounting system. In one embodiment, the tie down apparatus may include a receiving member, a tie down member, and a clocking member. The receiving member may include an opening located there through. The tie down member may include at least one aperture, wherein the tie down member may be capable of being located and rotated within the receiving member. The tie down member may be rotated either clockwise or counterclockwise. The locking member may include at least one leg capable of being housed within the aperture. The locking member may engage the receiving member once the tie down member is rotated, thereby trapping the item within the tie down apparatus.

A hitch mounting system may include at least one rail capable of being connected to a vehicle frame, at least one socket formed in the at least one rail, a mid rail connected to the at least one rail, where the mid rail includes a hitch ball socket, and a receiving member capable of being secured to the at least one socket. The hitch mounting system may also include a body member capable of being inserted into the receiving member, and a locking member extending through the body member, where rotating the body member in a direction displaces the locking member perpendicular to the direction of rotation engaging the locking member with the receiving member.

A hitch mounting system may include at least one rail capable of being connected to a vehicle frame, where the rail includes a pair of sockets integrally formed with the at least one rail, a mid rail capable of being connected to the at least one rail, where the mid rail includes a hitch ball socket, and a receiving member capable of being secured within the socket. The hitch mounting system may also include a body member having at least one aperture, where the body member is capable of engagement with the receiving member, and a locking member having at least one leg capable of being housed within the at least one aperture of the body member, where upon rotation of the body member about a first axis the locking member is displaced in a second axis parallel with the first axis engaging the locking member with the receiving member.

A hitch mounting system may include at least one tubular member, a central member attached to the tubular member, a pair of integrally formed members having first and second end portions, where the first end portions are received within the tubular member and the second end portions are capable of attaching to a frame of a vehicle, and a socket integrally formed in each of the pair of integrally formed members. The hitch mounting system may also include a pair of receiving members, where each of the pair of receiving members is positioned in the sockets, a body member inserted into the receiving member, and a locking member extending through the body member, where rotating the body member in a direction displaces the locking member perpendicular to the direction of rotation engaging the locking member with the receiving member securing the body member to the receiving member.

A tie down apparatus for securing an item is shown and described. The tie down apparatus may include a body member capable of being located and rotated about an axis within a receiving member. The tie down apparatus may also include a locking member extending through the body member, where rotating the body member about the axis displaces the locking member relative to the body member thereby engaging the locking member and generally preventing rotation of the body member within the receiving member.

A tie down apparatus for securing an item may include a monolithically formed body member capable of being located and rotated about an axis within a receiving member, the body member including at least one aperture and a pair of legs extending through the at least one aperture. The tie down apparatus may also include a bridge member attached between the pair of legs, where the pair of legs and bridge member being attached generally prevents separation of the pair of legs and bridge member from the body member.

A tie down apparatus for securing an item may include a body member capable of being positioned within a receiving member, a post extending from the body member a distance, and a locking member extending through the body member, the locking member comprising at least one leg extending through the body member. The tie down apparatus may also disclose where rotating the body member in a first direction along a plane displaces the at least one leg in a second direction perpendicular to the plane generally preventing rotation of the body member.

BRIEF DESCRIPTION OF THE DRAWINGS

Objects and advantages together with the operation of the invention may be better understood by reference to the detailed description taken in connection with the following illustrations, wherein:

FIG. 1 illustrates a perspective view of an embodiment of the safety chain tie down assembly in a locked position.

FIG. 2 illustrates a perspective view of the safety chain tie down assembly of FIG. 1 in an unlocked position.

FIG. 5 illustrates a perspective view of an embodiment of the insertion or tie down member in an unlocked position.

FIG. 6 illustrates a side view of the tie down member of FIG. 5.

DETAILED DESCRIPTION

Figure 4:
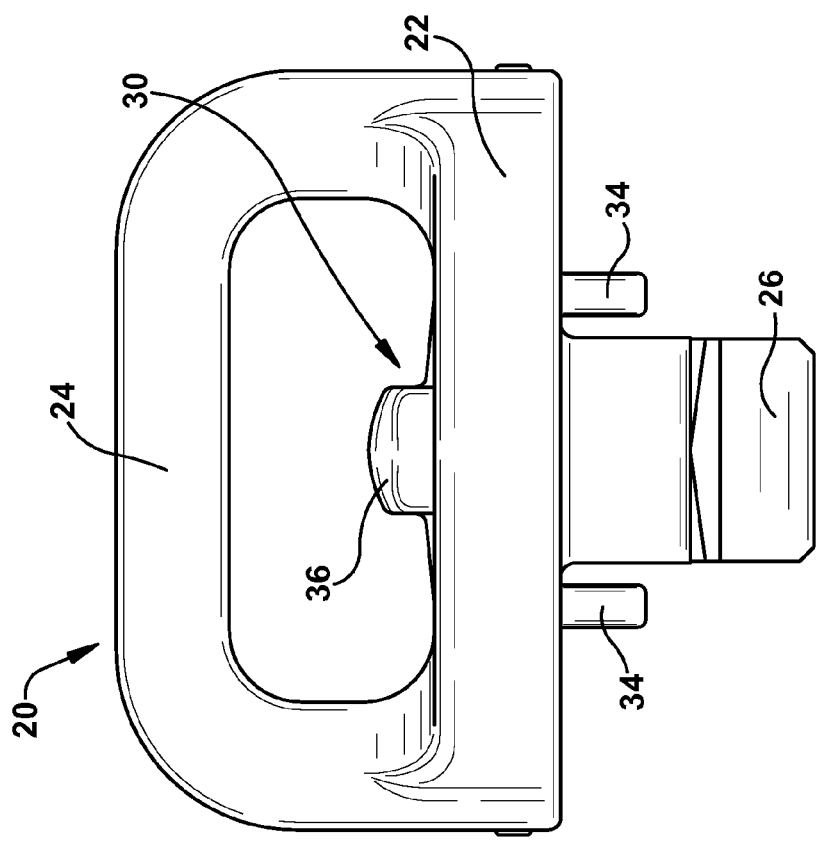
FIG. 4 illustrates a side view of the tie down member of FIG. 3.

Reference will now be made in detail to exemplary embodiments of the present invention, examples of which are illustrated in the accompanying drawings. It is to be understood that other embodiments may be utilized and structural and functional changes may be made without departing from the respective scope of the present invention.

A removable safety chain tie down apparatus or assembly 10 is illustrated in FIGS. 1 and 2. The removable safety chain tie down apparatus 10 can improve the safety of securing the trailer to a towing vehicle. The assembly 10 may include an insertion or tie down member 20, a locking member 30 and a receiving member 40. The tie down assembly 10 provides a practical and hidden safety chain tie down apparatus that may be associated with and attached to a trailer mounting system where the apparatus 10 may be adapted to reliably and securely engage the links of a safety chain (not shown). Unlike the prior art, the safety chain tie down assembly 10 may be reliably secured to the safety chain itself without the need for additional intermediate hooks or couplings that might be subject to failure.

The safety chain tie down apparatus 10 may be constructed to securely and removably anchor down the safety chain that may be in use with a trailer hitch. The apparatus 10 may be of any number of appropriate shapes or sizes in addition to those shown in the figures and may have a streamlined design and appearance that may be aesthetically pleasing. The safety chain apparatus 10 may be used with any appropriate trailer hitch mounting kit, such as those that utilize rail mounts or cross members 12 for example, such as with the "Signature Series" produced and sold by Cequent.

The insertion or tie down member 20 may be of any suitable shape or size, such as substantially ovalar, rectangular or other shapes. The tie down member 20 may be constructed from a variety of appropriate materials, such as of a durable plastic material. The tie down member 20 may be a one-piece integrally formed member.

The insertion or tie down member 20 is illustrated in FIGS. 1-6. The tie down member 20 may include a body 22, a handle 24 and a column or post 26. The handle 24 may extend outwardly from one side of the body 22. The column 26 may extend outwardly from an opposite side of the body 22, whereby the handle 24 and the column 26 may extend outwardly in opposite directions from one another.

Figure 3:
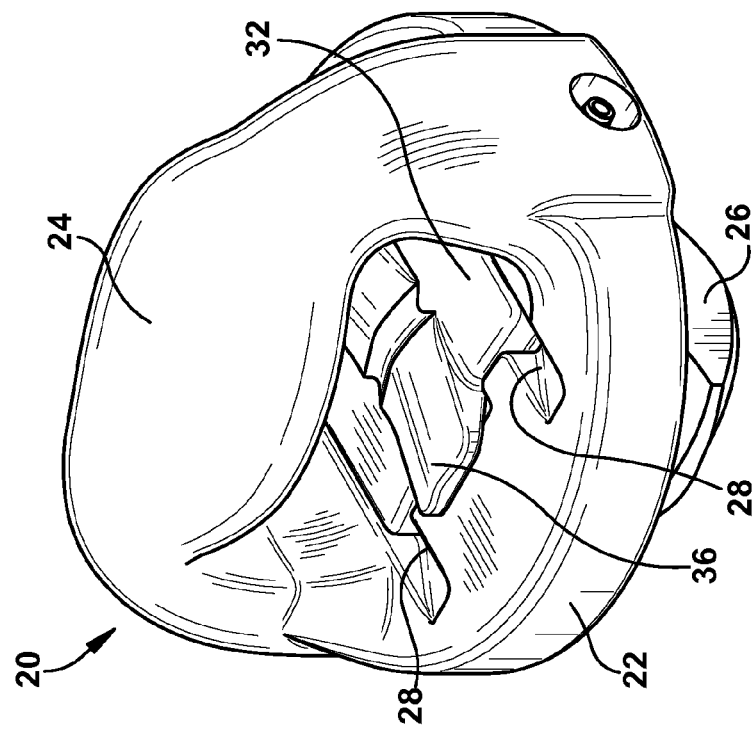
FIG. 3 illustrates a perspective view of an embodiment of an insertion or tie down member in a locked position.

The handle 24 may be of any appropriate shape or size. The handle 24 may also be of a contoured shape for ease and comfort of use, as best shown in FIGS. 3 and 5. While the handle 24 is shown as extending from two sides of the body 22, it is to be understood that the handle 24 may only be attached to the body 22 on one side (such as a generally L-shaped handle) or may be attached on any desired number of sides, such as three or four, and the like. In addition, the handle 24 may be integrally formed with the body 22 or may be a separate piece from the handle, which may require attachment by any appropriate means, such as with fasteners, welding, or the like.

The column 26 of the tie down member 20 may be of any appropriate shape or size, such as a cylindrical, ovalar, triangular or rectangular and are not be limited to the shapes shown in the Figures. The column or post 26 may also be curved into a generally hooked shape as it extends away from the body 22. The body 22 may include at least one aperture 28, as best shown in FIGS. 3 and 5. The aperture 28 may be of any appropriate shape or size, such as being correspondingly shaped and sized to a leg 34 on the locking member 30. The apertures 28 may be located on either side of the column 26.

Figure 11:
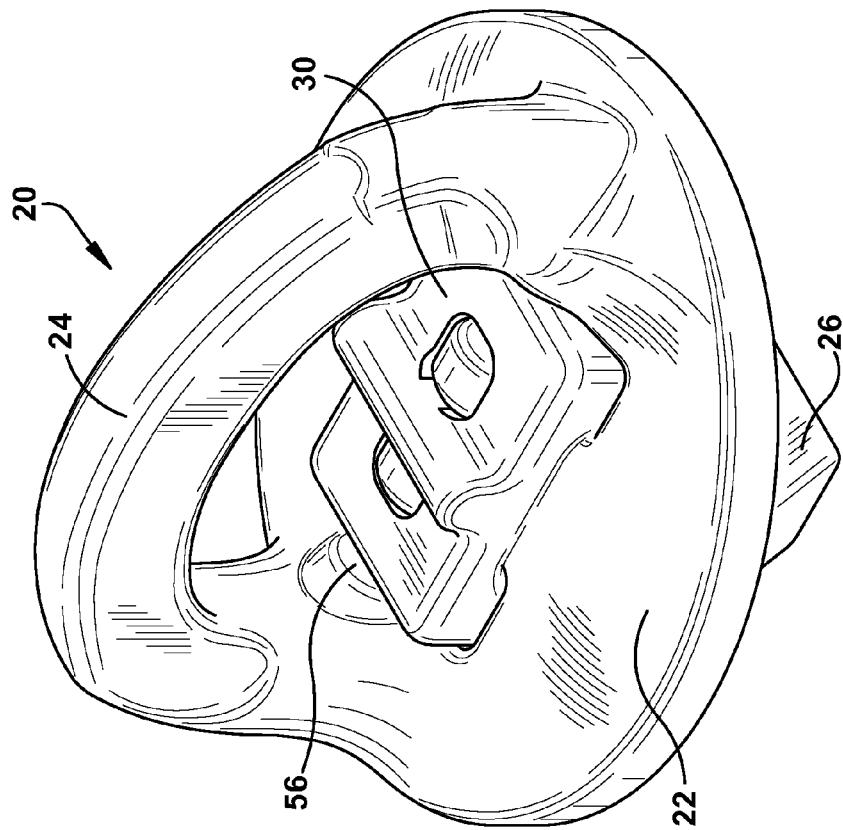
FIG. 11 illustrates a perspective view of an additional embodiment of a tie down member.
Figure 12:
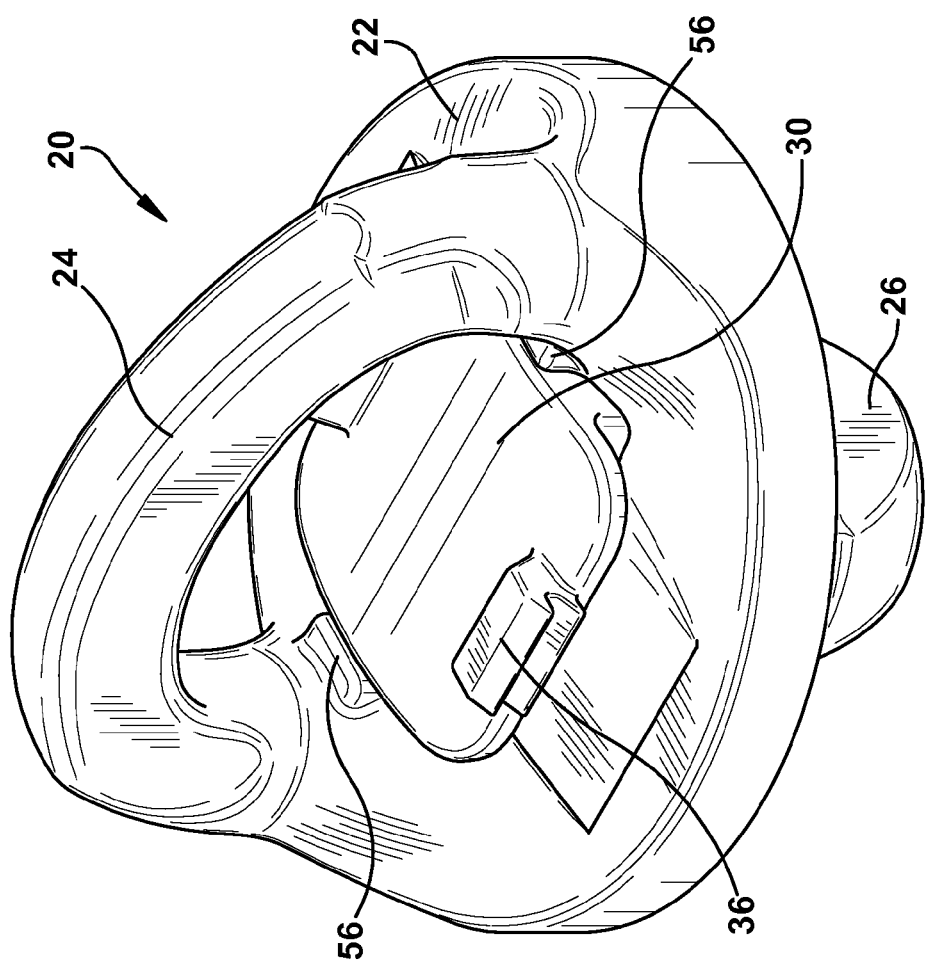
FIG. 12 illustrates a perspective view of an additional embodiment of a tie down member.
Figure 13:
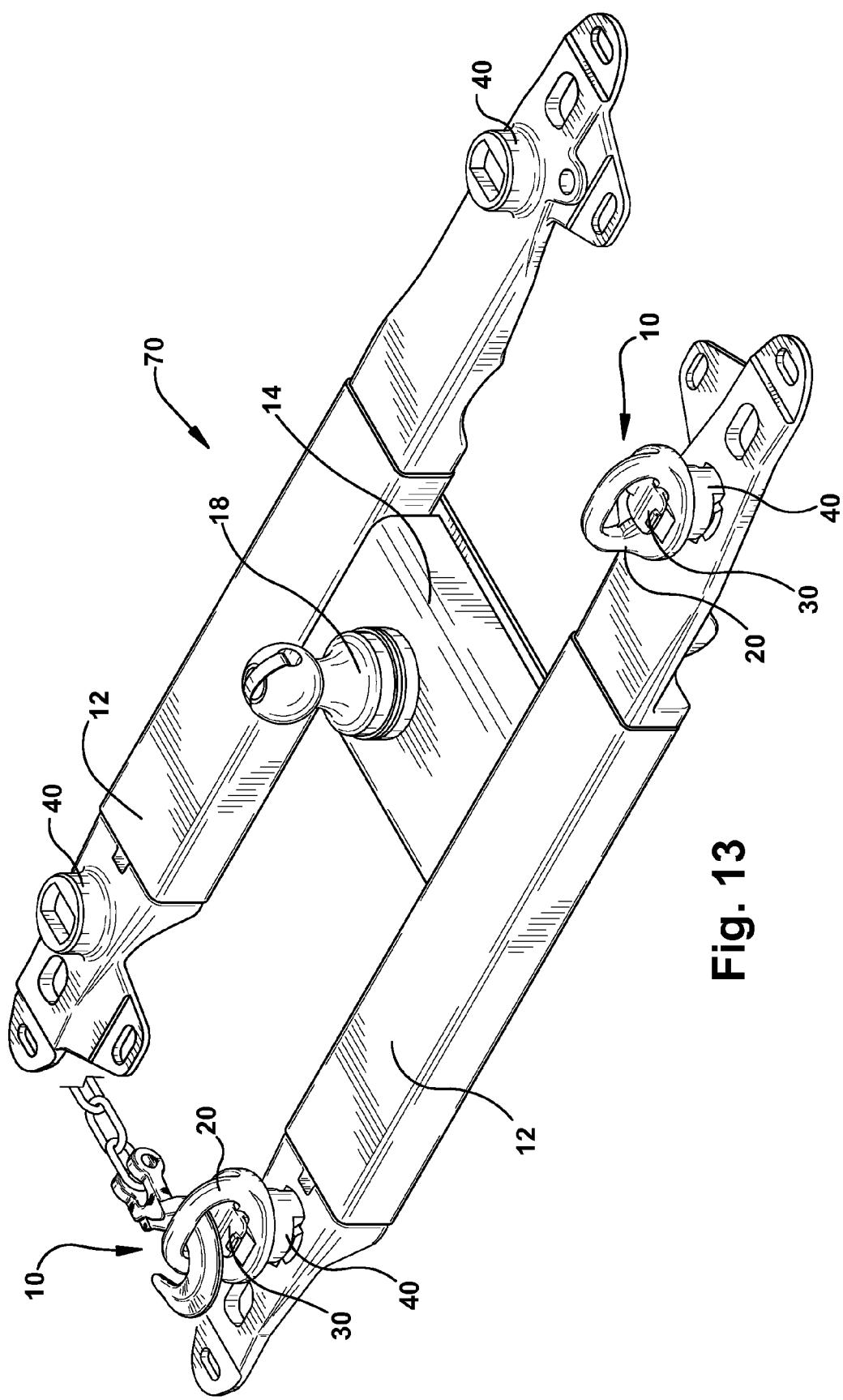
FIG. 13 illustrates a perspective view of an embodiment of an integrated hitch mounting system with an insertion or tie down member secured thereto and a chain secured to the insertion or tie down member.
Figure 14:
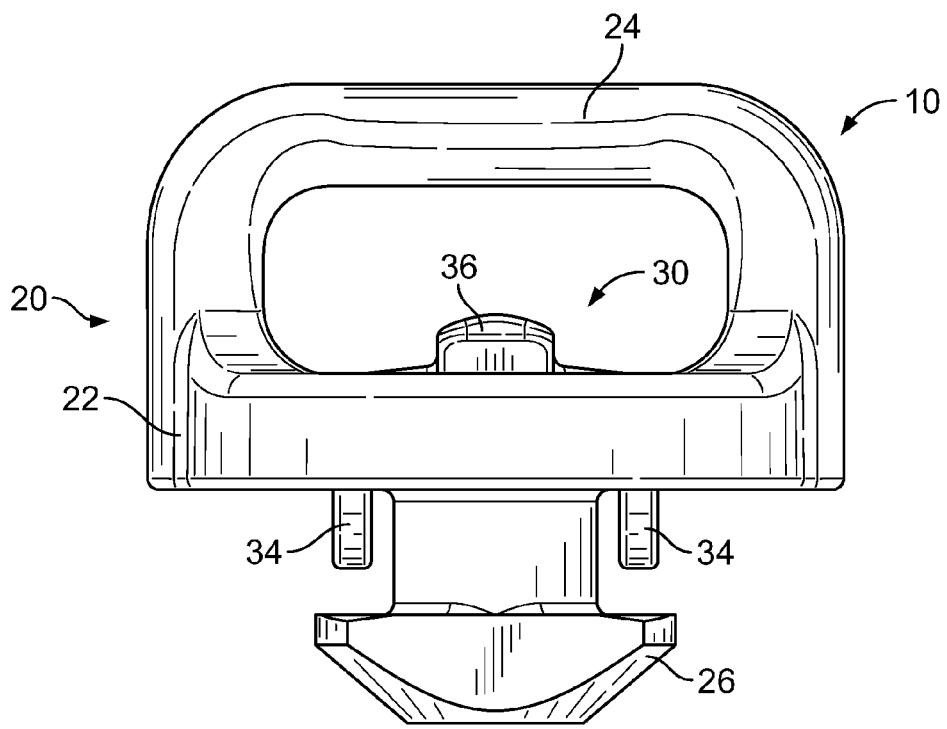
FIG. 14 illustrates a side view of embodiments of a tie down member.

In some embodiments the tie down member 20 may include at least one locking or compression tab 56 shown in FIGS. 11 and 12. The locking or compression tabs 56 may be positioned at any appropriate location on the tie down member 20, such as located near the base(s) of the handle 24. The locking tabs 56 may be of any appropriate shape or size, such as a generally circular or square shape, for example. The locking or compression tabs 56 either may allow for the locking member 30 to snap into a secure engagement with the body 22 or to provide a compression fit between the locking member 30 and the body The locking member 30 is illustrated in FIGS. 1-6. The locking member 30 may include a body or bridge member 32 and at least one leg 34. The bridge member 32 may be of any appropriate shape or size, such as a generally square, rectangular, or circular shape, for example. The locking member 30 may be a one-piece integrally formed member. On either end of the bridge member 32 there may be a leg 34. The legs 34 may extend outwardly, such as perpendicularly away from the bridge member 32, for example. The legs 34 may be of any appropriate shape or size, such as, for example, a cylindrical, ovular, rectangular, or flat plane, for example. While the locking component 30 has been shown and disclosed utilizing certain features, the locking component 30 may utilize any appropriate configuration to lock the safety chain into place within the tie down member 20 and receiving member 40.

Figure 10:
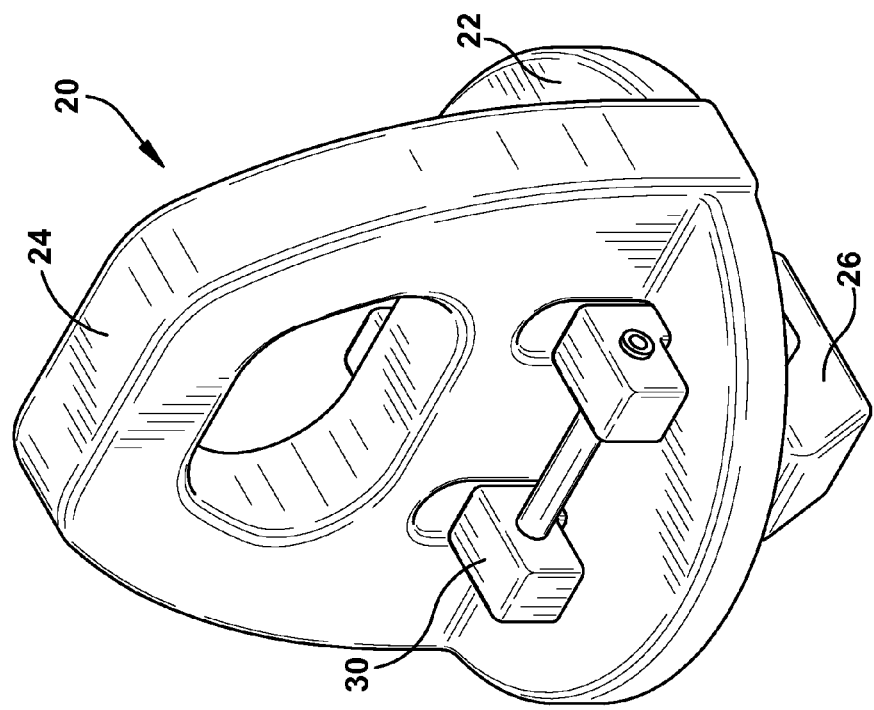
FIG. 10 illustrates a perspective view of an additional embodiment of an insertion or tie down member.

In some embodiments the locking member 30 may include at least one lifting tab 36, as shown in FIGS. 3-6. The lifting tabs 36 may be located at any appropriate location on the body or bridge member 32, such as on opposing sides of the legs 34 but should not be limited to such. The lifting tabs 35 may also be of any appropriate shape or size. The lifting tabs 36 may be utilized to ease and aid in the lifting of the locking member 30 up from within the tie down member 20. FIGS. 10-12 illustrate additional embodiments of the tie down member 20 and the locking member 30.

FIGS. 1, 2 and 7-9 illustrate the receiving member 40. The receiving member 40 may include an upper rim 42, at least one sidewall 44 and a base or bottom wall 46. The receiving member 40 may be of any appropriate shape or size, such as a cylindrical, oval, or a square shape, for example, and should not be limited to that shown in the Figures. The receiving member 40 may be a one-piece integrally formed member. The sidewalls 44 may extend generally perpendicularly from the upper rim 42. While shown having two sidewalls 44 it is to be understood that there may be any appropriate number of sidewalls 44 and should not be limited to that shown and disclosed herein.

The base or bottom wall 46 may connect the two sidewalls 44, as best shown in FIG. 2. The bottom wall 46 and the sidewalls 44 may generally form an opening 54 therein, as shown in FIG. 2. The receiving member 40 may also include an aperture 48 that may receive the column or post 26 of the tie down member 20, whereby the aperture 48 may also be correspondingly shaped and sized to receive the column 26. The upper rim 42 may extend radially and outwardly from the receiving member 40. The upper rim 42 may provide a surface for the body 22 of the tie down member 20 to abut or rest on, for example, as best shown in FIGS. 1 and 2.

In use and to secure a safety chain, for example, a consumer may place the tie down member 20 on top of the upper rim 42 of the receiving member 40, so that the column 26 may drop into the corresponding aperture 48. Once the tie down member 20 is placed within the receiving member 40, the consumer may rotate the tie down member 20 ninety degrees, either clockwise or counterclockwise, into a lock position, as best shown in FIGS. 1, 3 and 4.

When the components of the safety chain tie down apparatus 10 have been rotated into the correct position, the locking component 30 will drop into place, as shown in FIGS. 1, 3 and 4 The locking component 30 may prevent the tie down member 20 and thus the safety chain from coming out of the receiving member 40 during use. The locking component 30 may be captured in the receiving member 40 to prevent it from inadvertently coming out of the receiving member 40 when not in use. For example, when the safety chain components 20, 30, 40 are properly attached, it physically makes it impossible for the locking member 30 to unlock.

Trailer hitches, such as a gooseneck or fifth wheel hitch may be mounted to a truck bed. These types of hitches are often mounted beneath the truck bed in conjunction with the truck's own frame rails, such as with cross members or rails 12 for example. In addition, these cross members 12 may be mounted to the truck bed with the use of the receiving members 40, also known as pucks. Utilizing a puck mounting system for the trailer hitch may allow the hitch to be installed in the pickup truck bed with only four small holes. Utilizing a puck mounting system may provide uninhibited use of your truck bed when the hitch is dismounted. The puck mounting system may also provide for a wider platform and mounting surface, which increases the stability.

The safety chain tie down apparatus 10 may take advantage of an under bed mounting system designed for the various types of hitches. These types of hitches may mount on top of an under bed rail mounting system where the hitch ball may either be removed or folded down for easy access. For example, the safety chain apparatus 10 may allow users that have an existing rail kit to use the receiving members 40 for safety chain hook ups on gooseneck trailers.

Figure 7:
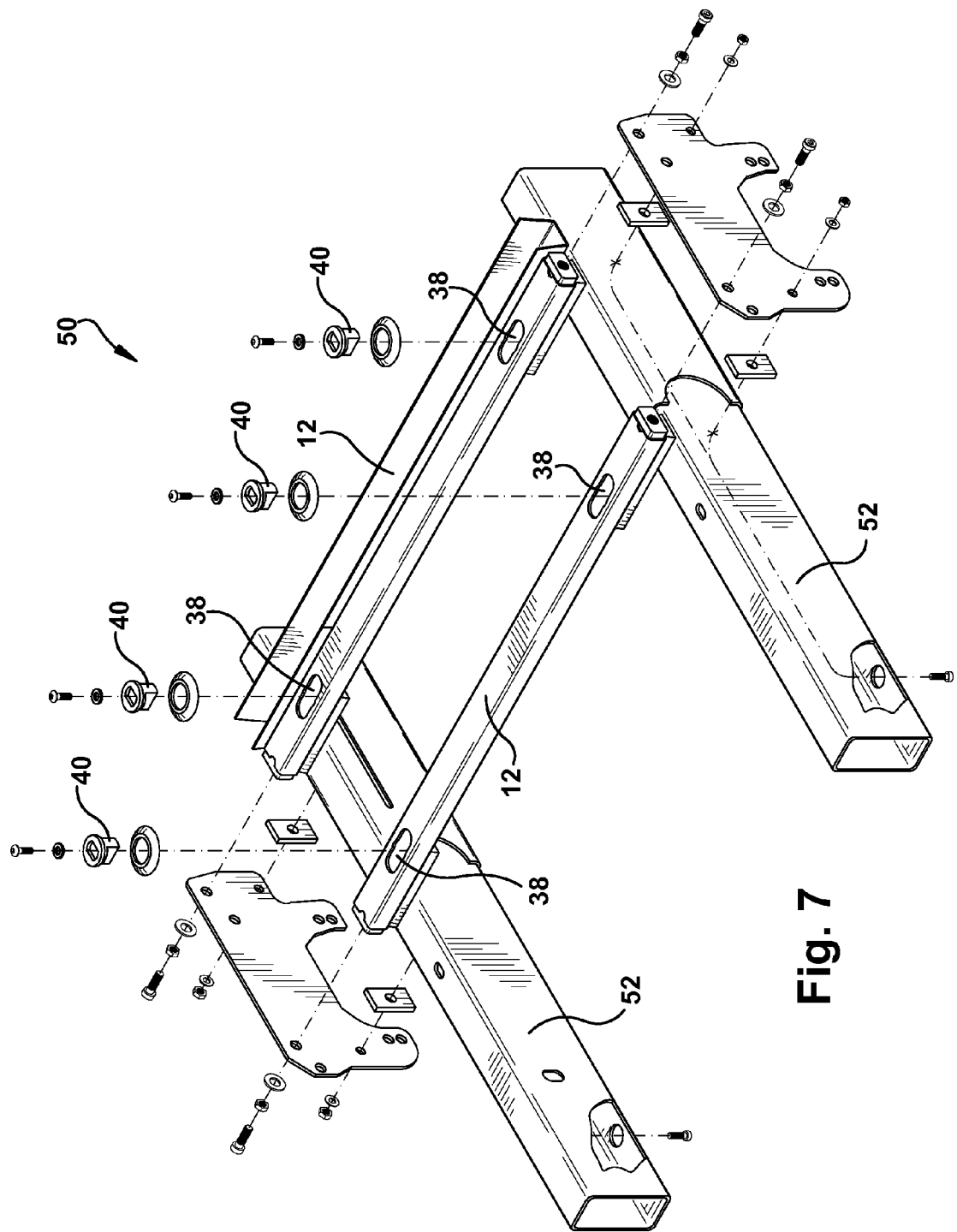
FIG. 7 illustrates a perspective view of a prior art hitch mounting system.

FIG. 7 illustrates a prior art vehicle mounting system 50. The vehicle mounting system 50 may include at least two rails or cross members 12. The cross members 12 may include sockets 38 for attachment with a receiving member 40. The cross members 12 may mount to the vehicle framework 52 by any appropriate means, such as with fasteners, by welding or the like. Each receiving member 40 may be mounted in a socket 38 provided in either of the cross members 12. The receiving member 40 may be secured in the socket 38 by any appropriate means, such as with fasteners, welding or the like. For example, a fastener, such as a bolt, could pass through an aperture in the bottom wall of the cross member 12 and be secured in place by a cooperating nut and lock washer (not shown) if desired.

Figure 8:
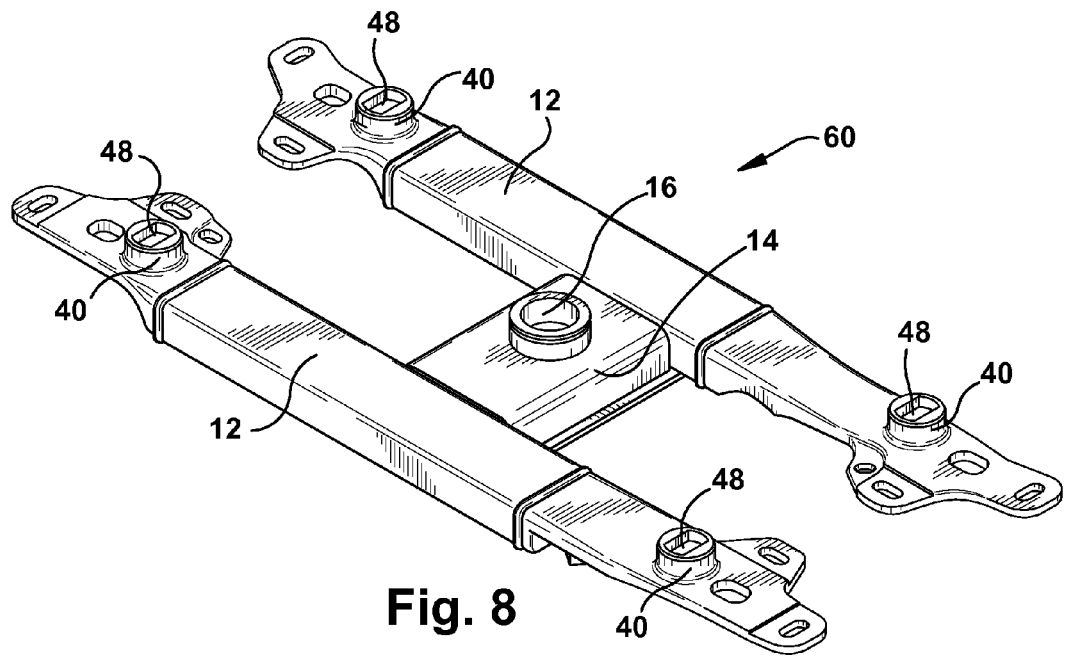
FIG. 8 illustrates a perspective view of an embodiment of an integrated hitch mounting system.
Figure 9:
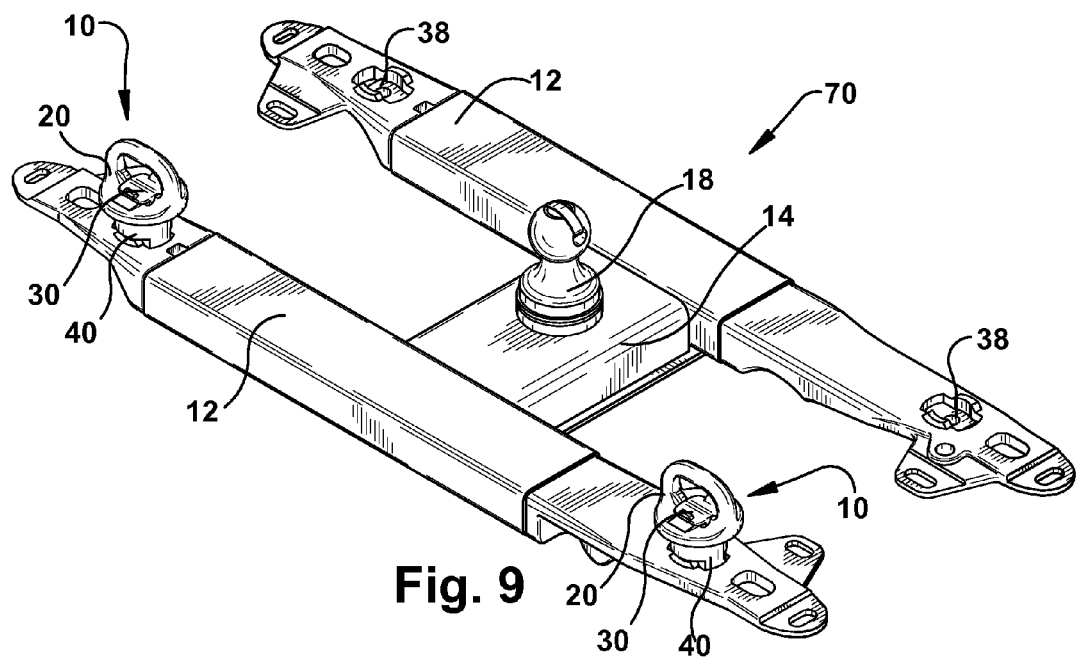
FIG. 9 illustrates a perspective view of an embodiment of an integrated hitch mounting system.

FIG. 8 illustrates an integrally formed mounting system 60, whereby the receiving members 40 may be formed within the cross members 12. FIG. 9 illustrates a mounting system 70 where the receiving members 40 may be placed and secured into sockets 38 located within the cross members 12. In FIGS. 8 and 9, the cross members 12 may be attached to one another by a mid rail 14. The hitch ball socket 16 and corresponding hitch ball 18 may be located on the mid rail 14.

Additional embodiments of a removable safety chain tie down apparatus according the present teachings are described below. In the descriptions, all of the details and components may not be fully described or shown. Rather, some of the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired removable safety chain tie down apparatus without departing from the spirit and scope of the present teachings.

A removable safety chain tie down apparatus or assembly 110, such as that shown in FIGS. 15-18, may include an insertion or tie down member 120, a locking member 130 and a receiving member 40. The safety chain tie down apparatus 110 may be constructed to securely and removably anchor down the safety chain often utilized with a trailer hitch. The safety chain tie down apparatus 110 may be of any appropriate configuration. It may possess any number of appropriate shapes or sizes in addition to those shown in the figures. The safety chain tie down apparatus may also have a streamlined design and appearance that may be aesthetically pleasing. The safety chain tie down apparatus 110 may be used with any appropriate trailer hitch mounting kit, such as those that utilize rail mounts or cross members 12 for example, such as with the "Signature Series" produced and sold by Cequent Performance Products, Inc. The present teachings, however, are not limited to the configuration shown or limited to use with the cross members 12 shown. The safety chain tie sown apparatus 110 may be utilized with any appropriate trailer hitch system.

The insertion or tie down member 120 may be of any suitable shape or size, such as substantially oval, rectangular or other shapes. The tie down member 120 may be constructed from a variety of appropriate materials, such as of an appropriate metal material or durable plastic material, including, without limitation high strength steel. The tie down member 120 may be a one-piece integrally formed member, i.e., a monolithic member. In such embodiments, the tie down member 120 may be formed from casting of high-strength steel by way of non-limiting example.

The insertion or tie down member 120 is shown in FIGS. 15-18. The tie down member 120 may include a body 122, a handle 124 and a column or post 126. The handle 124 may extend outwardly from one side of the body 122. The column 126 may extend outwardly from an opposite side of the body 122, whereby the handle 124 and the column 126 may extend outwardly in opposite directions from one another.

The handle 124 may be of any appropriate shape or size. The handle 124 may also be of a contoured shape for ease and comfort of use. While the handle 124 is shown as extending from two sides of the body 122, it is to be understood that the handle 124 may only be attached to the body 122 on one side (such as a generally L-shaped handle) or may be attached on any desired number of sides, such as three or four, and the like. In addition, the handle 124 may be integrally formed with the body 122, such as a monolithic member, or may be a separate piece from the body 122, which may require attachment by any appropriate means, such as with fasteners, welding, or the like. A greater strength may be realized when the handle 124 is monolithically formed with the body 122.

Figure 16:
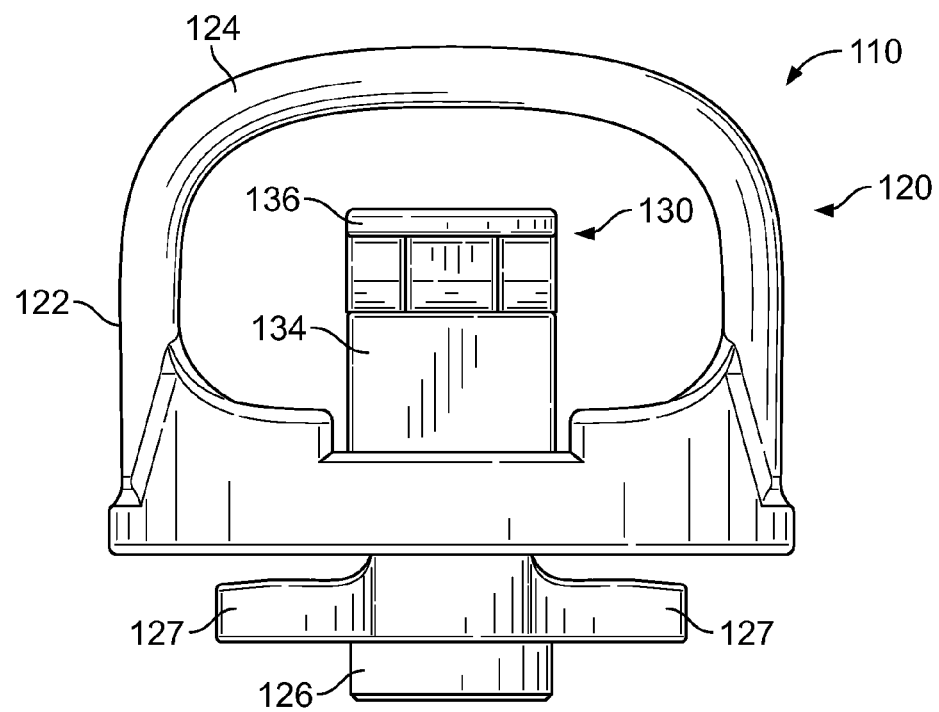
FIG. 16 illustrates a side view of the tie down member of FIG. 14 in an unengaged position.
Figure 17:
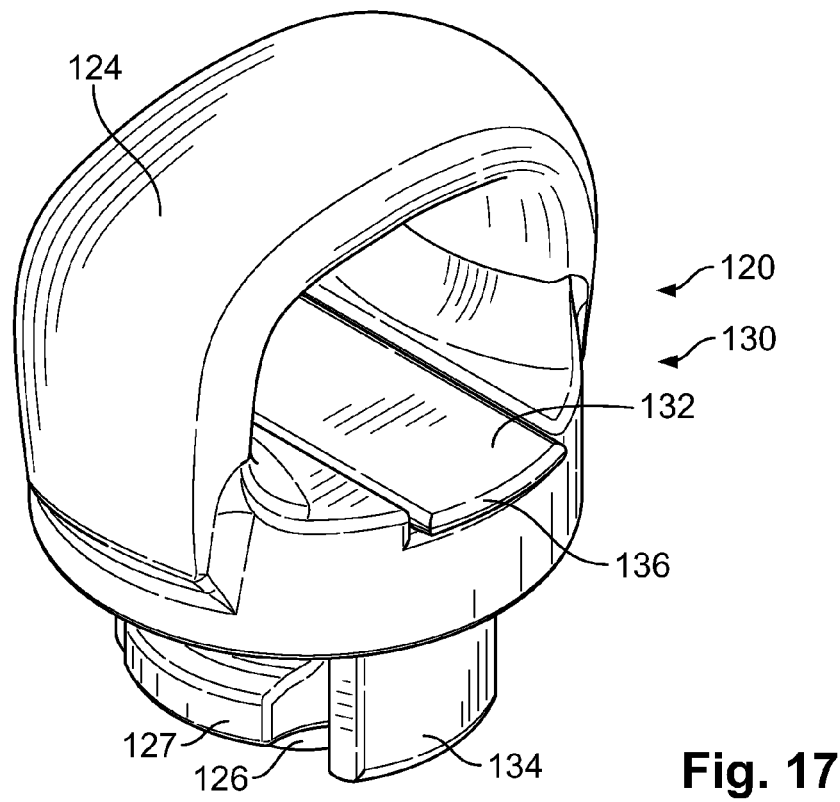
FIG. 17 illustrates a perspective view of the tie down member of FIG. 14 in an engaged position.
Figure 18:
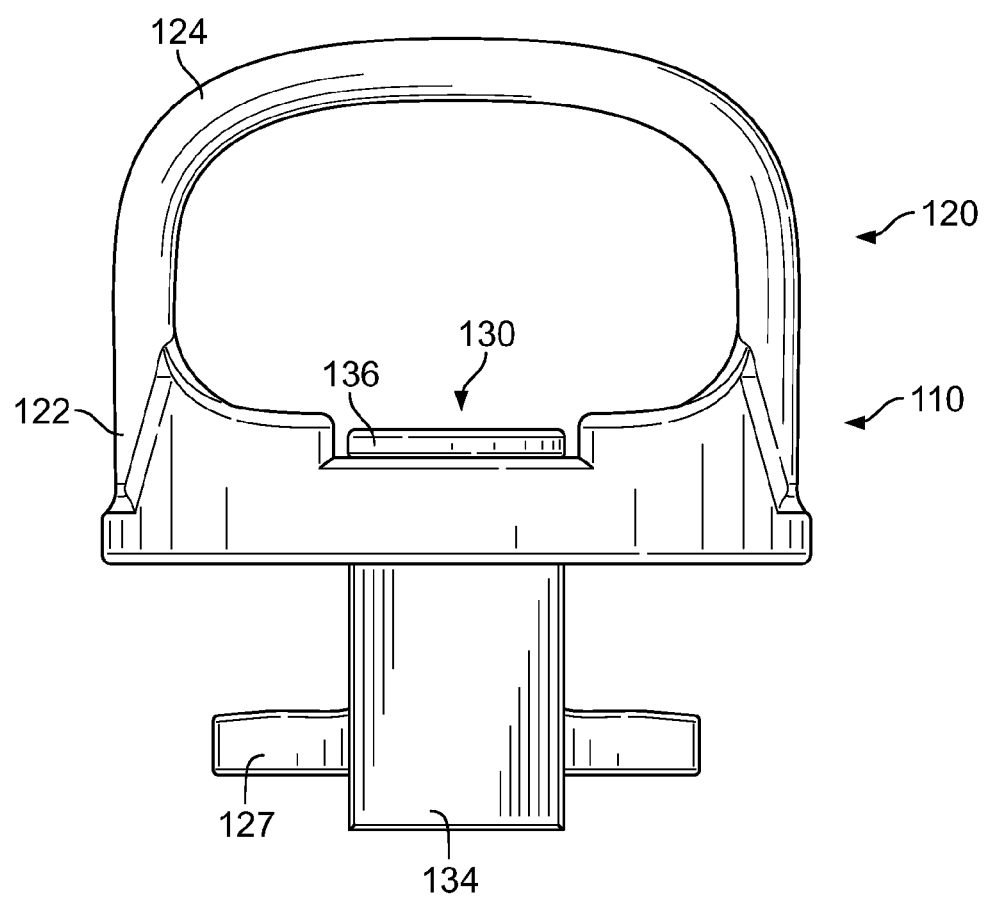
FIG. 18 illustrates a side of the tie down member of FIG. 14 in an engaged position.

The column 126 of the tie down member 120 may be of any appropriate shape or size, such as a cylindrical, oval, triangular or rectangular and are not be limited to the shapes shown in the Figures. The column or post 126 may also be curved into a generally hooked shape as it extends away from the body 122. By way of a non-limiting example, and as shown in FIG. 16, the post 126 may be of a generally T-shape such that a portion 127 may extend from the post 126 in a generally perpendicular direction to form the T-shape. In such embodiments, the post 126 may be inserted into the receiving member 40 and rotated such that the portion 127 engages the receiving member 40, such as a lower surface of receiving member 40, thereby preventing removal from receiving member 40. Engaging or locking the tie down member 120 with the receiving member 40 generally prevents the tie down member 120 from being removed from the receiving member 40.

Figure 15:
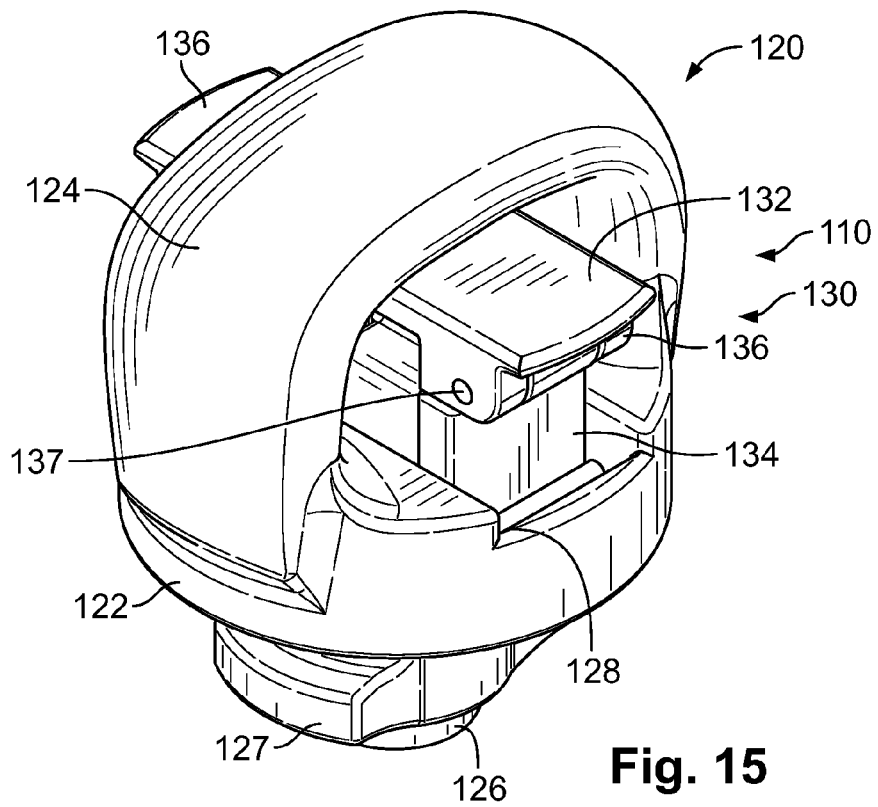
FIG. 15 illustrates a perspective view of embodiments of a tie down member.

The body 122 may include at least one aperture 128, as shown in FIG. 15. The aperture 128 may be of any appropriate shape or size, such as being correspondingly shaped and sized to receive a leg 134 on the locking member 130. Apertures 128 may be located on either side of the post 126. However, the present teachings are not limited to the configuration shown. Any appropriate configuration of the aperture 128 may be used.

The locking member 130 is shown in FIGS. 15-18. The locking member 130 may include a body or bridge member 132 and at least one leg 134. The bridge member 132 may be of any appropriate shape or size, such as a generally square, rectangular, or circular shape, for example. On either end of the bridge member 132 a leg 134 may be attached. By way of a non-limiting example, legs 134 may be attached at both ends of the bridge member 132. The legs 134 may extend outwardly, such as perpendicularly away from the bridge member 132, for example. The legs 134 may be of any appropriate shape or size, such as, for example, a cylindrical, ovular, rectangular, or flat plane, for example.

The legs 134 may be attached to the bridge member 132 in any appropriate manner, e.g., by welding, pinning, utilizing fasteners, adhering or a combination of such. By way of a non-limiting example, a pair of the legs 134 may be attached to each end of the bridge member 132 by pinning them together. The legs 134 and the bridge member 132 may include apertures 137 sized and configured to have a pin pass therethrough to secure them together. In such embodiments, the body 122, including the handle 124 and post 126, may be a monolithic member formed such as through casting.

In such embodiments, the legs 134 may be inserted into the apertures 128 in the body 122. The bridge member 132 may be positioned over the legs 134 such that each of the legs 134 extends perpendicularly from each end of the bridge member 132. The apertures 137 on the legs 134 and the bridge member 132 may be generally aligned. Once aligned, a pin member may be inserted into and through the apertures 137 securing the legs 134 with the bridge member 132. Although, the legs 124 may be attached to the bridge member 132 in any appropriate manner—they are not limited to being pinned. This configuration may result in the legs 134 and bridge member 132 being a trapped subassembly held within the body 122. This configuration may be very robust and may withstand significant forces, including, without limitation side forces. Prior art systems may not be designed or configured to withstand such side-loading. While the locking component 130 has been shown and disclosed utilizing certain features, the locking component 130 may utilize any appropriate configuration to lock the safety chain into place within the tie down member 120 and receiving member 40. Further, while the configuration and assembly of the legs 134 and bridge member 132 are shown and described above, the present teachings are not limited to such. Any appropriate configuration and assembly may be used without departing from the present teachings.

As noted above, the body 122 being a monolithic member may permit the tie down member 120 to be configured to withstand more forces and loads than other prior art tie down members are configured to handle. By way of a non-limiting example, the tie down member 120 may be configured to withstand side loads. The monolithic nature of the body 122 may generally avoid weak points that may otherwise be present in tie down members that have bodies attached through other methods. Moreover, the monolithic nature may result in the handle 124 being of a robust configuration such that it may withstand significant forces that may be applied during operation. The safety chain may be attached to the handle 124 and during such attachment, side loads may be applied—the tie down member 120 is configured to handle such side-loads. Further, the vertical legs 134 and bridge member 132 may be a trapped subassembly, i.e., they may be positioned within the body 122 and then attached as detailed above. This trapped subassembly may allow significant loads to be applied to the tie down member 120 during operation.

Further still, in some embodiments when the legs 134 are attached to the bridge member 132 and inserted into the apertures 128, the legs 134 may extend below from the body 122 a distance that is substantially equal to or greater than a distance the post 126 may extend from the body 122. By way of a non-limiting example, the legs 134 may extend down from the apertures 128 a distance that is generally equivalent to the length of the post 126. The extended length of the legs 134 may generally withstand additional lateral and twisting forces that other prior art designs are not configured to handle.

The locking member 130 may include at least one lifting tab 136. The lifting tabs 136 may be located at any appropriate location on the body or bridge member 132, such as on opposing sides of the legs 134 but should not be limited to such. The lifting tabs 136 may also be of any appropriate shape or size. The lifting tabs 136 may be utilized to ease and aid in the lifting of the locking member 130 up from within the tie down member 120.

Similar to that described above, in use and to secure a safety chain, for example, a consumer may place the tie down member 120 on top of the upper rim 42 of the receiving member 40 so that the post 126 may drop into the corresponding aperture 48 while upper rim 42 engages with legs 134 causing locking member 130 to move toward handle 124 such that it may be in an unlock position. Once the tie down member 120 is placed within the receiving member 40, the consumer may rotate the tie down member 120, an appropriate amount, such as ninety degrees, in a predetermined direction such as either clockwise or counterclockwise, into a lock position. In rotating the tie down member 120, the portions 127 may engage the receiving member 40, such as a lower surface, generally preventing removal of the tie down member 120 from the receiving member 40. When rotated the appropriate amount, legs 134 may align with aperture 48 and drop down into aperture 48 (moving away from handle 124) into a locking position. Legs 134 extending into aperture 48 may prevent rotation of tie down apparatus 110 relative to receiving member 40. Prevention of rotation maintains portions 127 engaged with receiving member 40 thereby preventing removal of tie down member 120 from receiving member 40.

When the components of the safety chain tie down apparatus 110 have been rotated into the correct position, the locking component 130 may drop into a locking position. The locking component 130 may prevent the tie down member 120 and thus a safety chain attached thereto from coming out of the receiving member 40 during use. The locking component 130 may be captured in the receiving member 40 to prevent it from inadvertently coming out of the receiving member 40 when not in use. By way of a non-limiting example, when the safety chain components 120, 130, 40 are properly attached, it physically makes it impossible for the locking member 130 to unlock.

Specifically, the locking component 130 when in the locking position generally prevents the tie down member 120 from rotating within the receiving member 40. The legs 134 operatively engage the receiving member 40 generally preventing rotation of the tie down member 120 to an unlocked position. As the tie down member 120 is generally prevented from rotating, the portions 127 remain engaged with the receiving member 40. This generally prevents the tie down member 120 from becoming disengaged or otherwise unlocked from the receiving member 40. Further, when the safety chain is inserted into the loop formed by the handle 124, it may rest against the locking component 130 or otherwise block movement of locking component 130 to an unlocked position. By way of a non-limiting example, the safety chain may engage the handle 124 and rest against the bridge member 132 and lifting tabs 136 if present. The safety chain may generally fill the open space of the handle 124, which may further prevent the locking component 130 from disengaging from the tie down member 120. The safety chain may generally prevent the legs 134 from rising within the apertures 128 a distance sufficient to allow rotation of tie down member 120 to an unlocked position. As the safety chain generally prevents the legs 134 from rising, the tie down member 120 cannot rotate within the receiving member 40 as the legs 134 prevent rotation of the tie down member 120 to the unlocked position. The tie down member 120 being incapable of rotating permits the portions 127 to remain engaged with the receiving member 40 preventing removal of the tie down member 120 from the receiving member.

In operation, the safety chain tie down apparatus may be used with trailer hitches. Trailer hitches, such as a gooseneck or fifth wheel hitch may be mounted to a load bed of a vehicle. These types of hitches are often mounted beneath the load bed in conjunction with the truck's own frame rails, such as with cross members or rails 12 for example. In addition, these cross members 12 may be mounted to the truck bed with the use of the receiving members 40, also known as pucks. Utilizing a puck mounting system for the trailer hitch may allow the hitch to be installed in the pickup truck bed with only four small holes. Utilizing a puck mounting system may provide uninhibited use of your truck bed when the hitch is dismounted. The puck mounting system may also provide for a wider platform and mounting surface, which increases the stability.

The safety chain tie down apparatus 110 may take advantage of an under bed mounting system designed for the various types of hitches. These types of hitches may mount on top of an under bed rail mounting system where the hitch ball may either be removed or folded down for easy access. For example, the safety chain apparatus 110 may allow users that have an existing rail kit to use the receiving members 40 for safety chain hook ups on gooseneck trailers.

The tie down 120 may be of a construction to handle significant loads. It may be capable of functioning with high-rated, heavy-duty gooseneck systems. The tie down 120 may be capable of handling not only forces in fore and aft directions relative to the rails 12, but also forces in side-to-side directions. Specifically, the monolithically formed body 122 along with the trapped subassembly of the locking component 130, i.e., the bridge member 132 and legs 134, and the longer length legs 134 contribute to the tie down member 120 being capable of handling these additional loads.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, I claim:

1. A tie down apparatus for securing an item, the tie down apparatus comprising:
    a body member rotatable about an axis between first and second rotational positions within a receiving member; and
    a locking member extending through the body member and being axially moveable relative to the body member between first and second axial positions, wherein the locking member in the second axial position prevents rotation of the body member from the second rotational position to the first rotational position and the locking member is prevented from moving from the first axial position to the second axial position until the body member is rotated from the first rotational position to the second rotational position.

2. The tie down apparatus of claim 1, wherein the receiving member causes the locking member to move to the first axial position when the body member is inserted into the receiving member and moves to the second axial position when the body member is rotated to the second rotational position.

3. The tie down apparatus of claim 1, wherein the body member includes a handle contoured to secure a safety chain.

4. The tie down apparatus of claim 3, wherein the body member includes a post extending in a direction opposite the handle, whereby the post engages the receiving member when the body member is in the second rotational position.

5. The tie down apparatus of claim 1, wherein rotating the body member about the axis from the first rotational position to the second rotational displaces the locking member in a direction generally parallel to the axis from the first axial position to the second axial position.

6. The tie down apparatus of claim 5, wherein the body member includes at least one aperture.

7. The tie down apparatus of claim 6, wherein the locking member comprises:
    a pair of legs extending through the at least one aperture; and
    a bridge member attached between the pair of legs, wherein the pair of legs and bridge member are operatively engaged with the body member whereby the pair of legs and bridge member being attached generally prevents separation of the pair of legs and bridge member from operative engagement with the body member.

8. The tie down apparatus of claim 7, wherein the locking member includes at least one lifting tab.

9. The tie down apparatus of claim 8, wherein the at least one lifting tab is located on an opposite side of at least one of the pair of legs whereby displacing the lifting tab away from the body member disengages the locking member permitting the body member to rotate about the axis from the second rotational position to the first rotational position.

10. The tie down apparatus of claim 1, wherein a chain is capable of being attached to the body member whereby the chain generally prevents the locking member from moving from the second axial position.

11. The tie down apparatus of claim 1, wherein the body member is rotatable in either of a clockwise and counter clockwise direction.

12. The tie down apparatus of claim 1, wherein the locking member in the second axial position prevents rotation of the body member to the first rotational position.

13. The tie down apparatus of claim 1, wherein the body member is rotatable from the first rotational position to the second rotational position in clockwise and counter-clockwise directions.

14. The tie down apparatus of claim 1, wherein the locking member engages with features of the receiving member when in the second axial position thereby preventing rotation of the body member.

15. The tie down apparatus of claim 14, wherein the locking member engages other features of the receiving member when the body member is in the first rotational position thereby preventing the locking member from moving from the first axial position to the second axial position.

16. The tie down apparatus of claim 15, wherein the other feature is a top surface of the receiving member.

17. The tie down apparatus of claim 15, wherein the locking member is aligned with aperture on the receiving member when the body member is in the second rotational position thereby allowing axial movement between the first and second axial positions.

18. A tie down apparatus for securing an item, the tie down apparatus comprising:
   a monolithically formed body member rotatable about an axis between first and second rotational positions within a receiving member, the body member including at least one aperture;
   a pair of legs extending through the at least one aperture; and
   a bridge member attached between the pair of legs, wherein the pair of legs and bridge member being attached generally prevents separation of the pair of legs and bridge member from the body member.

19. The tie down apparatus of claim 18, wherein rotating the body member about the axis to the second rotational position allows displacement of the pair of legs from a first axial position to a second axial position generally preventing rotation of the body member.

20. The tie down apparatus of claim 19, further comprising the receiving member, wherein the pair of legs being displaced to the second axial position engages the pair of legs with the receiving member generally preventing rotation of the body member from the second position.

21. The tie down apparatus of claim 20, wherein the body member includes a post extending from the body member a distance, whereby the post is capable of engaging the receiving member substantially preventing rotation of the body member from the second rotational position.

22. The tie down apparatus of claim 21, further comprising a chain selectively attached to the body member, whereby the pair of legs generally maintains engagement of the post with the receiving member during application of side forces.

23. The tie down apparatus of claim 22, wherein the pair of legs extend a leg distance form the body member whereby the leg distance is substantially equivalent the distance when the pair of legs are in the second axial position.

24. A tie down apparatus for securing an item, the tie down apparatus comprising:
   a body member capable of being positioned within a receiving member;
   a post extending from the body member a fixed distance;
   a locking member extending through the body member, the locking member comprising at least one leg extending through the body member; and
   wherein rotating the body member along a plane allows axial displacement of the at least one leg perpendicular to the plane, whereby axial displacement of the at least one leg generally prevents rotation of the body member.

25. The tie down apparatus of claim 24, wherein the locking member further comprises a bridge member attached with the at least one leg, wherein the at least one leg and bridge member being attached generally prevents separation of the at least one leg and bridge member from the body member.

26. The tie down apparatus of claim 25, further comprising the receiving member, wherein displacing the at least one leg engages the at least one leg with the receiving member generally preventing rotation of the body member.

27. The tie down apparatus of claim 26, further comprising a chain selectively attached to the body member, whereby the at least one leg generally maintains engagement of the post with the receiving member during application of side forces.

28. A tie down apparatus for securing an item, the tie down apparatus comprising:
   a body member rotatable about an axis between first and second rotational positions within a receiving member; and
   a locking member extending through the body member and being axially moveable relative to the body member between first and second axial positions, wherein the locking member in the second axial position prevents rotation of the body member from the second rotational position to the first rotational position and the receiving member causes the locking member to move to the first axial position when the body member is inserted into the receiving member and moves to the second axial position when the body member is rotated to the second rotational position.

* * * * *